(12) United States Patent
Gregg et al.

(10) Patent No.: US 7,952,998 B2
(45) Date of Patent: May 31, 2011

(54) INFINIBAND CREDIT-LESS FLOW CONTROL FOR LONG DISTANCE LINKS

(75) Inventors: Thomas A. Gregg, Highland, NY (US); David Craddock, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/621,600

(22) Filed: Jan. 10, 2007

(65) Prior Publication Data

US 2008/0165690 A1 Jul. 10, 2008

(51) Int. Cl.
*G01R 31/08* (2006.01)
(52) U.S. Cl. .......................................... 370/229
(58) Field of Classification Search .................. None
See application file for complete search history.

(56) References Cited

U.S. PATENT DOCUMENTS

| | | | | |
|---|---|---|---|---|
| 6,581,100 | B1 * | 6/2003 | Durin et al. ................... | 709/230 |
| 7,058,723 | B2 * | 6/2006 | Wilson .......................... | 709/235 |
| 2005/0286516 | A1 * | 12/2005 | Sundaresan et al. .......... | 370/389 |
| 2006/0176832 | A1 * | 8/2006 | Miceli ........................... | 370/260 |
| 2006/0209692 | A1 * | 9/2006 | Usuda et al. .................. | 370/232 |
| 2007/0081454 | A1 * | 4/2007 | Bergamasco et al. ......... | 370/229 |
| 2007/0223504 | A1 * | 9/2007 | Jain et al. ...................... | 370/412 |
| 2008/0186849 | A1 * | 8/2008 | Kampmann et al. .......... | 370/232 |

OTHER PUBLICATIONS

Infiniband Architecture Specification, vol. 1, Rel. 1.2, Oct. 2004.

* cited by examiner

*Primary Examiner* — Chi H Pham
*Assistant Examiner* — Fan Ng
(74) *Attorney, Agent, or Firm* — Steven Chiu

(57) ABSTRACT

An Infiniband flow control scheme disables credit based flow control so that transmission distances can be extended. An Infiniband credit based flow control suffers from round trip time lag that slows transmission rates. Disabling Infiniband credit based flow control enables back to back packet transmission because credit counts are ignored. Nonetheless, packets can be lost due to overruns in a receive buffer, therefore, packet drop detection mechanisms are employed so that the Infiniband receiver can send requests to the Infiniband transmitter to temporarily slow its Infiniband transmission rate.

14 Claims, 7 Drawing Sheets

INFINIBAND CREDIT-LESS FLOW CONTROL FOR LONG DISTANCE LINKS

The industry standard InfiniBand™ Architecture Specification available from the InfiniBand® Trade Association contains subject matter related, in certain respect, to the subject matter of the present application. The above-identified document is incorporated herein by reference in its entirety.

BACKGROUND OF THE INVENTION

1. Technical Field of the Invention

This invention pertains to an InfiniBand based long distance solution to replace proprietary Inter System Channel links. In particular, the present invention provides a flow control mechanism that does not use the InfiniBand-defined credit exchange, thus allowing transmission distances to be extended.

2. Description of the Prior Art

Credit based flow control is based upon communication exchange between senders and receivers of data. In general, a receiver will acknowledge to a sender that it is currently capable of receiving an amount of data. The sender, under a credit based protocol, will not send data unless such an acknowledgment is received. Such acknowledgments may also specify, perhaps cumulatively, as a receiver's buffer is unloaded, how much data can be received by a receiving device. Because these necessary exchanges between senders and receivers consume travel time, a large amount of data, e.g.megabytes, may need to be buffered while the exchanges are taking place. As transmission distances increase round trip travel time increases and so the buffer sizes must accommodate packets in transit while credit exchanges are taking place.

The Infiniband ("IB") interface and protocol is useful for transmission of data packets over distances of approximately several hundred meters, depending on bandwidth requirements, without use of repeaters or intermediate switches. With repeaters, these distances can increase to hundreds of kilometers, however, the aforementioned round trip time consumed by credit exchanges is magnified. One solution for extending transmission distances over an IB interface is to override or disable IB flow controls that tend to waste bandwidth. Flow controls are useful to avoid data overruns, however, they require buffer resources at the receiver. Dropped packet detection together with throttling mechanisms are necessary when flow controls are disabled in order to detect dropped packets, due to slowed memory subsystems and buffer overruns, and to slow the data transmission rate. In these instances, request packets can be sent to the transmitting devices directing them to slow their rate of data transmission, for example.

Credit packets can each communicate varying amounts of credit, thus, they can be sent occasionally or frequently, as the case may be. Credit packets can each represent an absolute amount of available buffer space in the receiver or they can represent increments of buffer memory as it becomes available. Conventionally, IB implements an absolute representation in each packet.

SUMMARY OF THE INVENTION

An Infiniband communication link may be a point-to-point connection that couples nodes containing transmitting and receiving devices in each node. A method and apparatus for operating the nodes according to the present invention includes the nodes exchanging credit information over the link to control the other node's rate of data transmission over the link. The receiving devices in each node comprise a data buffer for storing transmitted data from the other node, while the transmitting devices in each node comprise credit count logic for keeping track of available space in the other node's receive buffer. Disabling a transmitting device from honoring the credit information sent by the other node over the link, and tracked in the credit logic, enables greater data transmission rates. This inventive feature requires that the receiving devices monitor dropped packets that were sent by the other node due to lack of buffer space. In such a circumstance, the receiving device sends a request to the other node to decrease the rate of data transmission.

Another embodiment of the present invention comprises a receiving device in one of the nodes that is communicating over the IB link. The receiving device, or "receiver", includes an input coupled to the IB link and a data buffer for storing incoming IB packets. It also includes an output coupled to the IB link for sending credit data indicating an amount of available space in its data buffer. A circuit monitors the data buffer for dropped packets due to lack of buffer space. If dropped packets are detected, the node transmits over the IB link a request for decreasing the transmission rate.

Another embodiment of the present invention comprises a transmitting device, or "transmitter," in one of the nodes that is communicating over the IB link. The transmitter includes an output coupled to the IB link for transmitting IB packets and an input for receiving credit data and other requests from the receiver, such as requests to decrease a current transmission rate. In another embodiment, the transmitter includes a circuit for interpreting the credit data and for slowing the current transmission rate in response to a slow down request. The transmitter is capable of transmitting data packets back to back without regard to the distance between nodes if the credit data is ignored.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BEST MODE FOR CARRYING OUT THE INVENTION

Figure 1:
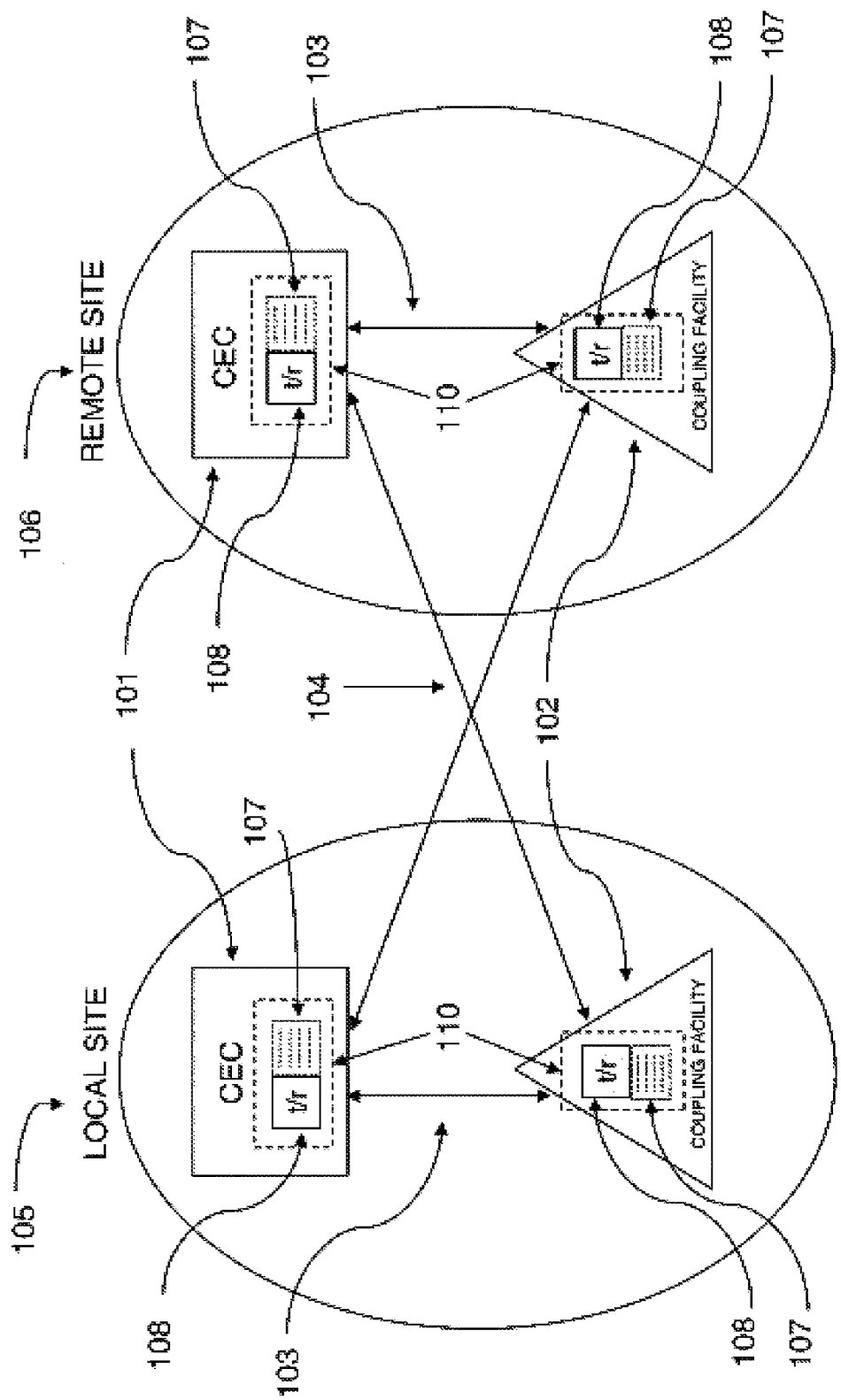
FIG. 1 illustrates an example of point to point connections of IB nodes.

With reference to FIG. 1, illustrated is an example point to point network configuration between two sites 105 and 106.

Each of the sites includes a central electronics complex 101 communicating with a corresponding coupling facility 102 over a short distance bidirectional IB link 103. Point to point communication between the nodes traverses long distance bidirectional IB links 104. Each of the devices at one end of a communication link 110 comprises a transmitter and receiver 108 because each device must keep track of, and communicate to the other device via credit packets, how much space is available at the device's receive buffer so that it can control a rate of data transmission over the bidirectional link. Typically, these devices 110 are IB channel adapters coupled to the system 101 or 102 and to the IB link 104 or 103.

Computer code 107 in each of the devices 110 operates to control hardware in accordance with the features and functionality of a method for practicing the present invention. Each of the Exemplary sites 105 and 106 can be configured as a System z Sysplex comprising z9 mainframes manufactured by IBM Corp. of Armonk, N.Y. This example configuration is not intended to be exhaustive. Each of the local or remote sites could also comprise multiple CECs and multiple Coupling Facilities. The CECs could also contain an internal Coupling Facility rather than external as illustrated. The same machine can be configured to operate as a CEC and as a Coupling Facility. The general functionality provided by the Coupling Facility includes coupling together the CECs. Depending on the complexity of current technology and the physical properties of the links 103 or 104, what is considered long distance can vary, however, in general, as an example, a one kilometer link, give or take, or longer can be considered as "long distance" for purposes of explanation. These links can also extend for many kilometers, which would also be considered long distance links.

Figure 2:
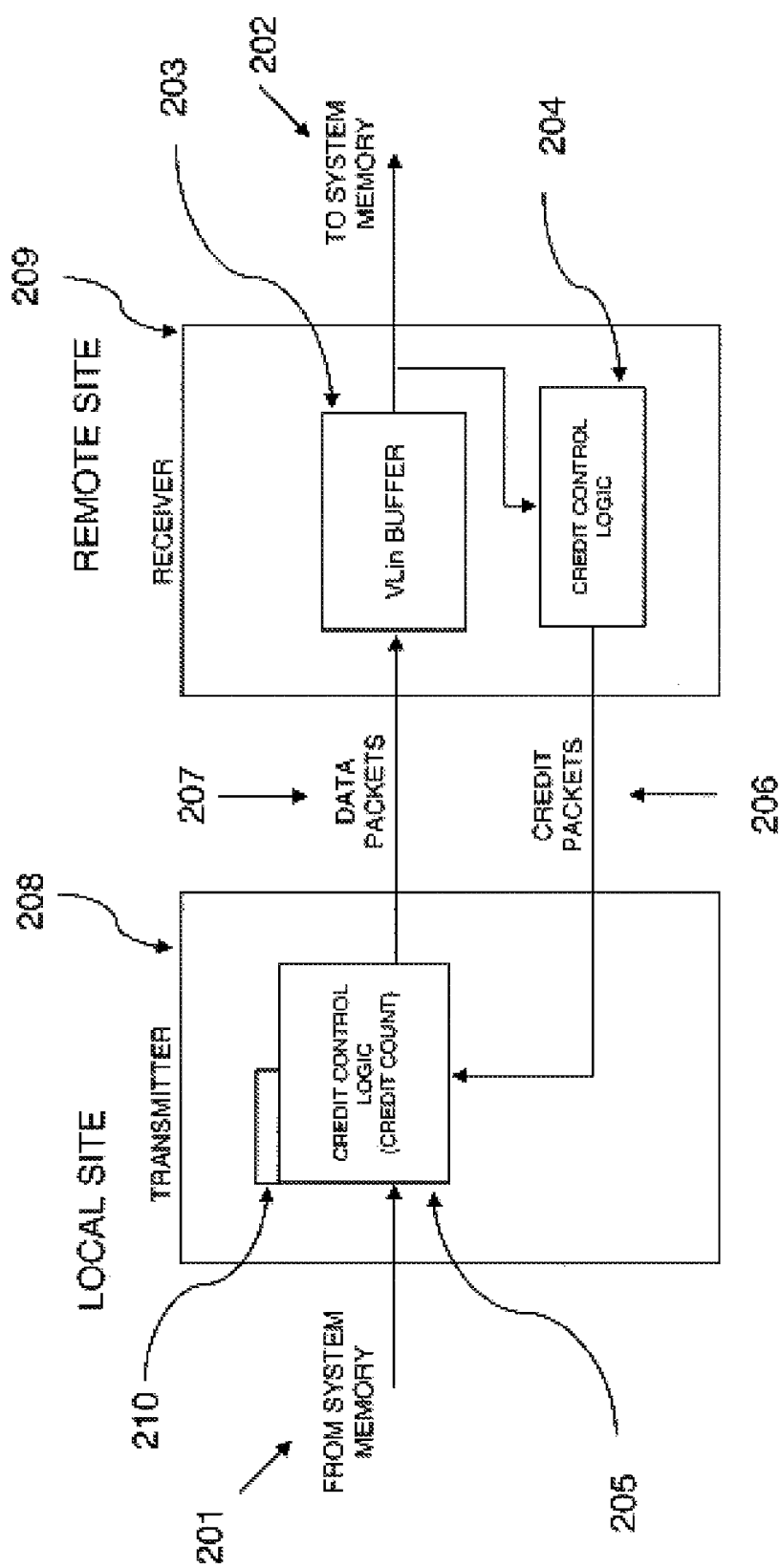
FIG. 2 illustrates a transmitter in one IB site and a receiver in another IB site.

With reference to FIG. 2, there is illustrated an exemplary transmitter and receiver that are contained in each of the devices, the CECs and Coupling Facilities, as explained above and illustrated in FIG. 1. However, the coupling between receiver 209 and transmitter 208 in this FIG. 2, e.g. data packets 207 sent from transmitter 208 to Virtual Lane in (VLin) buffer 203 of receiver 209 and credit packets 206 sent by receiver 209 to transmitter 208, illustrates, for purposes of a "long distance" communication example, a transmitter at one of the sites 105 and 106 communicating with a receiver at another of the sites 105 and 106.

In operation, the transmitter 208 sends data packets 207 only when there is sufficient space in the receiver's VLin buffer 203. The amount of available space in the receiver's buffer is known to the transmitter by its credit control logic, or credit count 205. The transmitter accumulates credits in the credit control logic as the credit packets 206 are received from the receiver 209. As is prevalent in the IB protocol an indication of total available space in the receive buffer is sent with every credit packet, rather than as a cumulative count, though either one can be implemented with accuracy. Typically, for example, one credit is equivalent to sixty four bytes, indicating that that amount of buffer space is available in the receiver. When the transmitter sends a data packet 207, it decrements its credit count in 205 according to the size of the packet sent. As data is received in system memory 202 from the buffer at the receiver end, the receiver's credit control logic 204, which is coupled to the VLin buffer, detects this movement of data out of the receiver's VLin buffer 203 and periodically generates and sends credit packets 206, containing either cumulative or total information, to the transmitter 208 to inform the transmitter that more space is available in the receiver's buffer. The transmitter 208 then receives the credit packets 206 from the receiver 209 and increments its credit count in credit control logic 205 accordingly, whether increasing incrementally per a cumulative communication or replacing its credit count per an absolute credit count. Control register 210 in the transmitter includes a mode bit for disabling circuitry in the transmitter that makes use of the credit data. When the mode bit is set to disable, the transmitter ignores credit data and sends data packets at an unrestricted rate, i.e. at a maximum rate, unless it receives a request from the receiver to slow transmission. The mode bit instructs the hardware to send data without checking the flow control credit counter. Typically, configuration software (firmware) will control the status of this mode bit or, optionally, control software can be set by human operator command.

Figure 3:
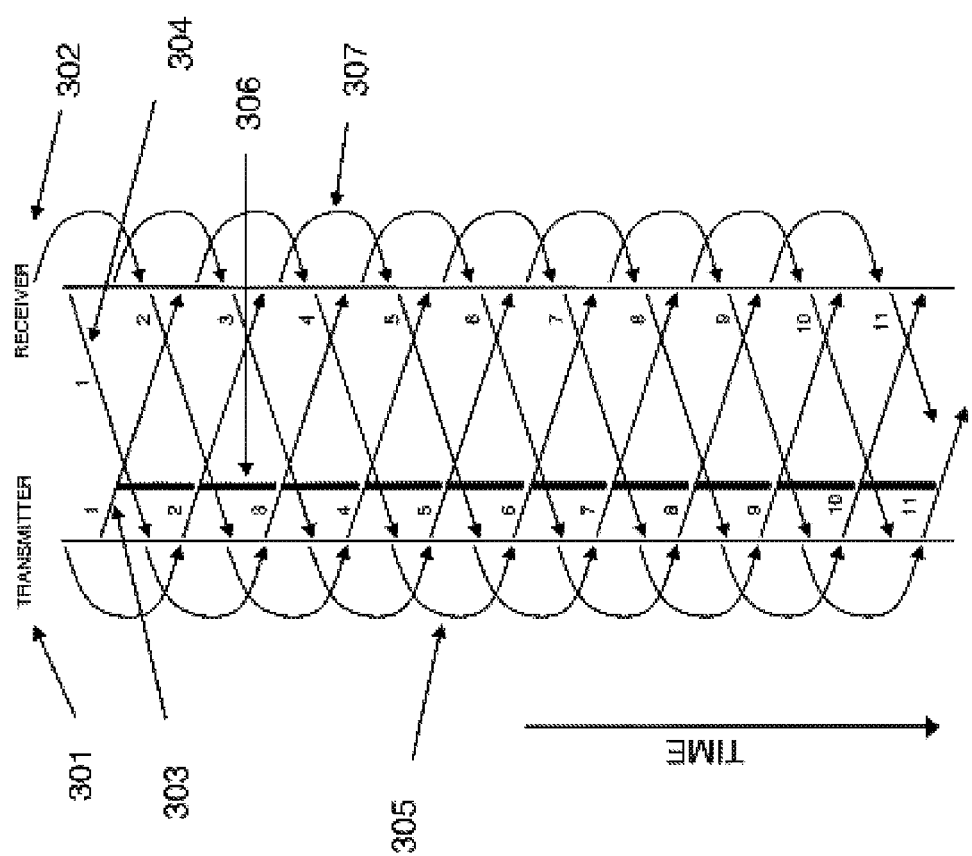
FIG. 3 illustrates communication latency between two IB nodes at a short distance using credit based flow control.

With reference to FIG. 3, there is illustrated an exchange of data packets 1-11 303 sent by the transmitter 301 to the receiver 302, and credit packets 1-11 304 sent by the receiver to the transmitter. This is a typical credit based flow control exchange according to one embodiment of the present invention. The time interval indicated by 307 illustrates the time required to partially unload the VLin buffer, and is measured from the time that the data packet is received, processed, and unloaded, until a credit packet is sent indicating a size of the space that is created by the unloading. Each of the transmitter and receiver use up a certain amount of processing time when receiving data and credit packets. In this example short distance communication exchange between transmitter and receiver, the transmitter is sending packets back to back without any delay waiting to receive credit packets from the receiver. The time interval 306 indicates the time required for the transmitter to transmit a data packet. In this example, there is negligible or no waiting time between transmission of data packets. For illustrative purposes, data packet sizes are approximately of equal length and are sent at regular intervals. Similarly, for illustrative purposes, the credit packets are also sent at regular intervals as indicated by the equidistant spacing of the lines representing the sent credit packets. In actual operation, data and credit packets may be sent at irregular intervals and each carrying varying amounts of data or, in the case of credit packets, indicating varying amounts of available buffer space.

This exemplifies the short distance characteristic that the transmitter does not waste bandwidth available to it due to excessive round trip times waiting for credit packets. The round trip time is the total time taken for a data packet sent by the transmitter to traverse a distance to the receiver, the receiver unloading the data packet and sending a credit packet indicating the space made available due to the unloading, and the time taken by the credit packet to traverse the distance back to the transmitter. This is indicated at 305 where the credit required, credit packet 4, to transmit, for example, data packet 6 is received before it is required, i.e. data packet 5 is yet to be sent by the transmitter.

Figure 4:
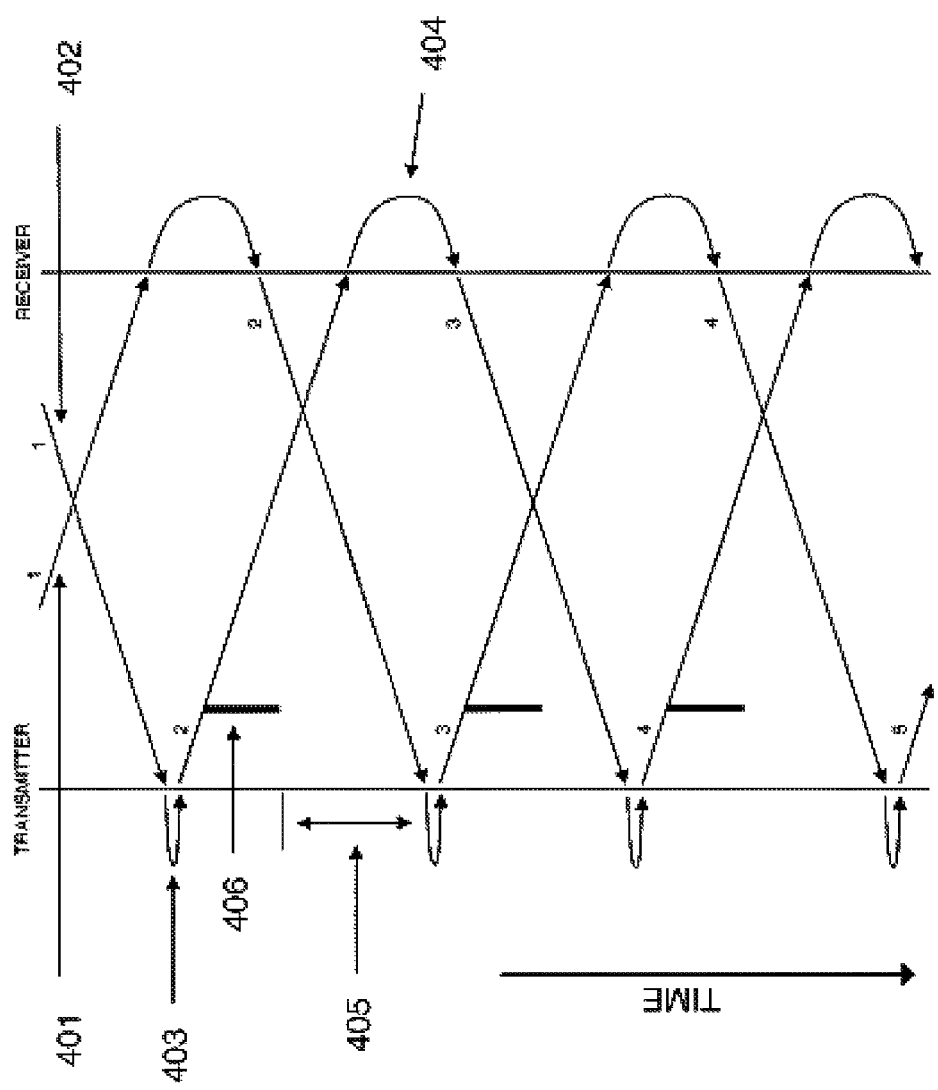
FIG. 4 illustrates communication latency between two IB nodes at a long distance using credit based flow control.

With reference to FIG. 4, there is illustrated a credit based flow control exchange, but with a longer distance between transmitter and receiver which introduces a delay in the rate of data packet 401 transmission by the transmitter because it must wait to receive credit packets 402 from the receiver. In this situation the transmitter and receiver are capable of operating at the same rate as in the short distance example of FIG. 3, the only difference being that the distance between them is greater. The slope of the lines representing traversal of data and credit packets are the same as between FIGS. 3 and 4, indicating travel speed is the same. The time intervals 307 and 404 are the same, indicating that the receiver is processing received data packets at the same rate. Because the transmitter is waiting to receive credit packets before it sends a data packet, due to credit based flow control protocol limitation, its turn around time 403 is shorter than the turnaround time 305 in the short distance example. The transmitter is capable of sending equivalent data packets at the same rate as the rate in the short distance example of FIG. 3. In this instance the transmitter is not sending data packets back to back as it was in the shorter distance example of FIG. 3. The credit packets that are required to transmit data packets 401 are not arriving in time and the transmitter is delayed by an amount of time 405 indicating the amount of wasted bandwidth due to data and credit packet travel time, even though the time required by the receiver to unload data packets 404 and the time required by the transmitter to send a packet 406 remains the same as 306 in the short distance example of FIG. 3. The time taken by the receiver to unload a data packet and send a credit packet is independent of the distance between transmitter and receiver. This example illustration shows that as the transmitter and receiver are further apart, it takes more time for the packet to travel from the transmitter to the receiver. The wasted time 405 is caused by the round trip time increase resulting from the distance between transmitter and receiver.

Figure 5:
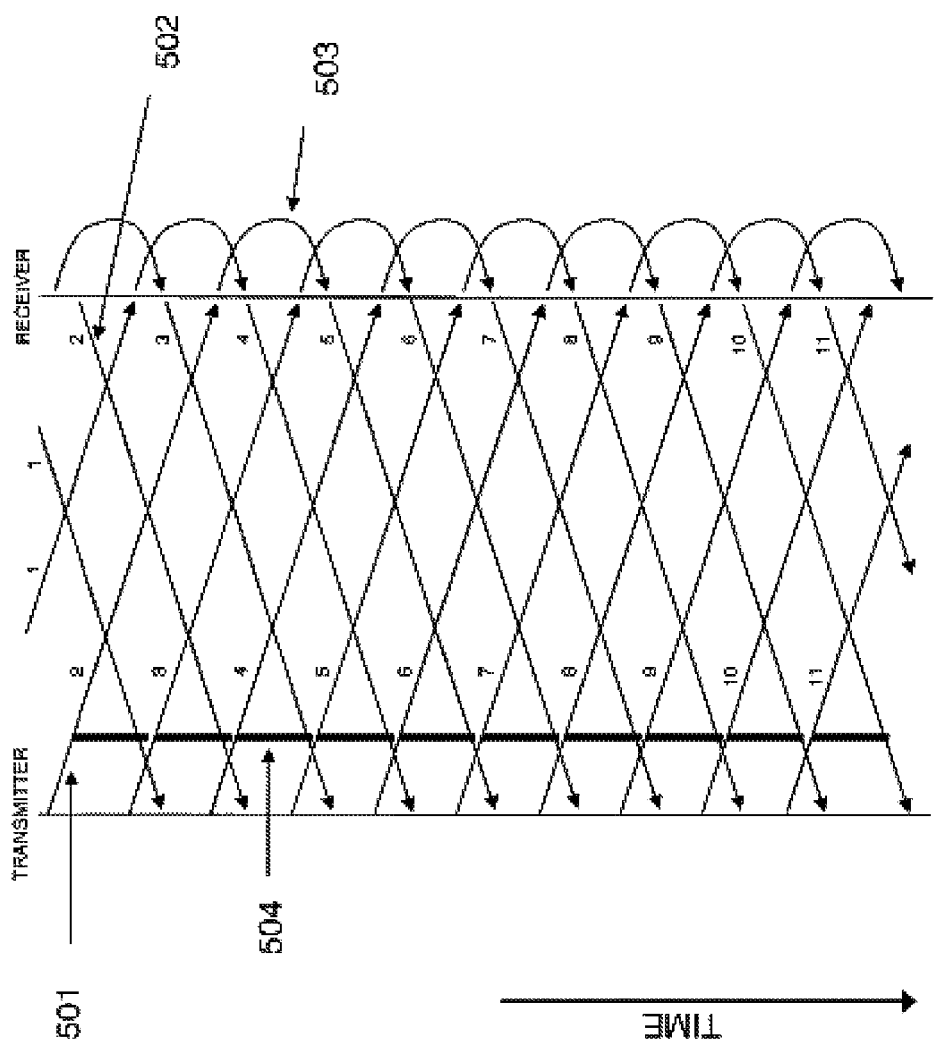
FIG. 5 illustrates communication latency between two IB nodes at a long distance without flow control.

With reference to FIG. 5, there is illustrated a transmitter and receiver at the same distance as that shown in FIG. 4 except that credit based flow control is turned off. This enables packets to be exchanged at the same rate as in the short distance example of FIG. 3 but at the longer distance. This is because the transmitter, in this example embodiment, is sending packets 501 back to back with negligible delay and without waiting for credit packets 502 because the transmitter is ignoring the incoming credit packets. However, the receiver has no knowledge that the transmitter is ignoring the credits. The time to unload the buffer 503 remains the same as well as the time taken to transmit a packet 504. Thus, due to disabling the credit based flow control, the rate of packet transmission at the longer distance is equivalent to the short distance rate of transmission.

Figure 6:
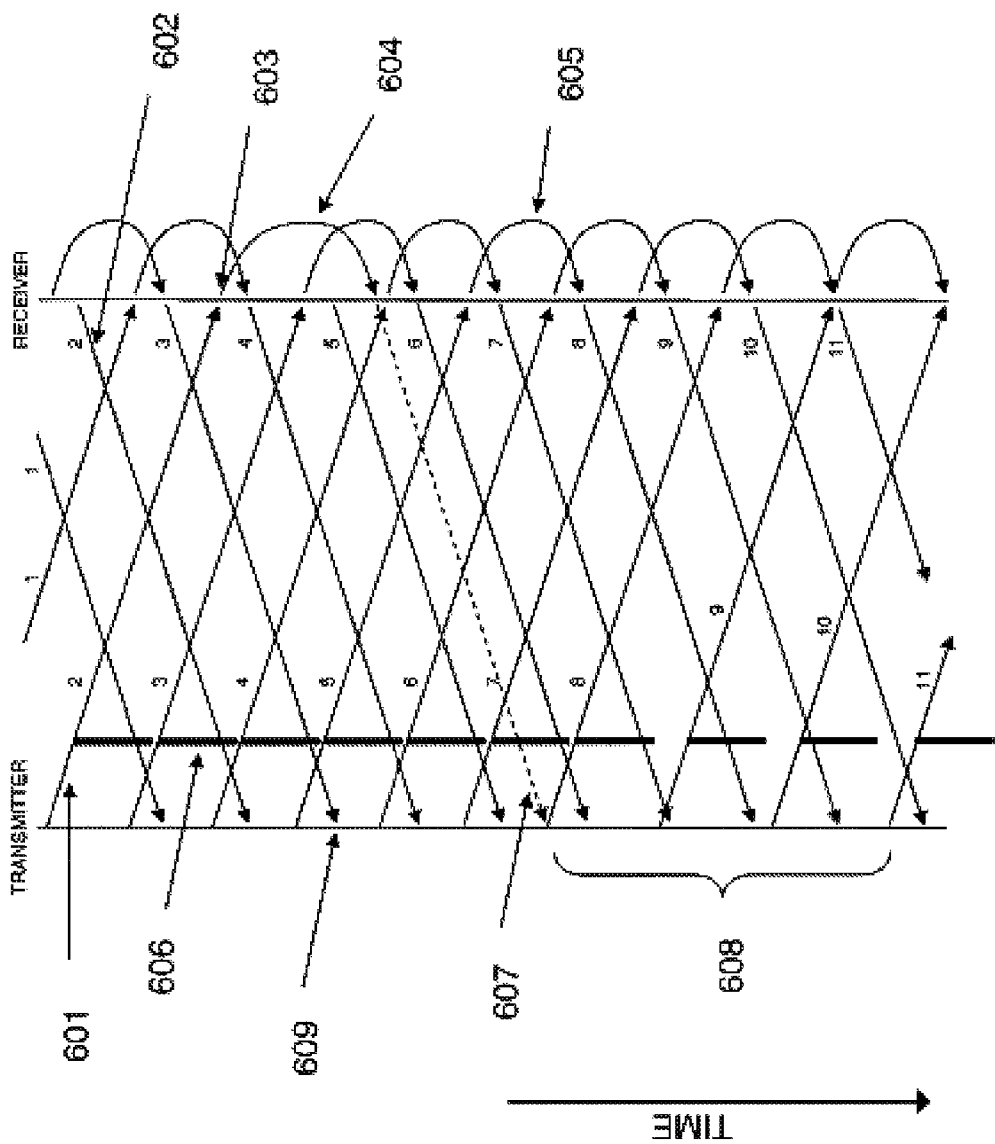
FIG. 6 illustrates communication latency between two IB nodes at a long distance using a delay based flow control.

With reference to FIG. 6, there is illustrated an example instance where a transmitter data packet 601 that is sent back to back is dropped at the receiver 603 due to its VLin buffer being full. The transmitter, in this example, is not waiting for credit packets 602 and ignores incoming credit packets 609. In response to detecting this condition 604 (or in response to detecting some other preselected number of dropped packets), a slow down packet 607 is sent from the receiver to the transmitter. This detection mechanism comprises a well known hardware interrupt to the receiver's processor which results in program code generating the slow down packet sent to the transmitter. This slow down packet typically is in the format of an IB management datagram. It is received at the transmitter and is processed there such that the interpacket delay for outgoing packets is increased. The IB protocol implements a well known static rate control mechanism, see, e.g., section 9.11 of the Infiniband Architecture Specification, for controlling interpacket delay. Standard IB devices contain mechanisms for detecting dropped packets and for static rate control (inter packet delay) in a data transmitter. Although the conventional usage of the interpacket delay mechanism is for controlling the injection rate of packets in a path comprising links of different speeds (such as in a switched network), it is applicable for the usage described herein—when flow control is bypassed. Similarly, if and when the receiver stops dropping packets, it is also capable of sending a speed up command packet to the transmitter.

The time to unload the buffer 605 remains the same as well as the time taken to transmit a packet 606. In response to receiving the slow down packet 607, the transmitter introduces an inter packet delay and slows its rate of data packet transmission 608. One of the benefits of the present invention is that the slow down packet can instruct the transmitter to incrementally slow transmission so that packets are not dropped but not slowed so much as to introduce a large amount of wasted bandwidth, which may occur with a credit based flow control as shown in FIG. 4. This is demonstrated by comparing the amount of wasted bandwidth in FIG. 4 and FIG. 6.

Figure 7:
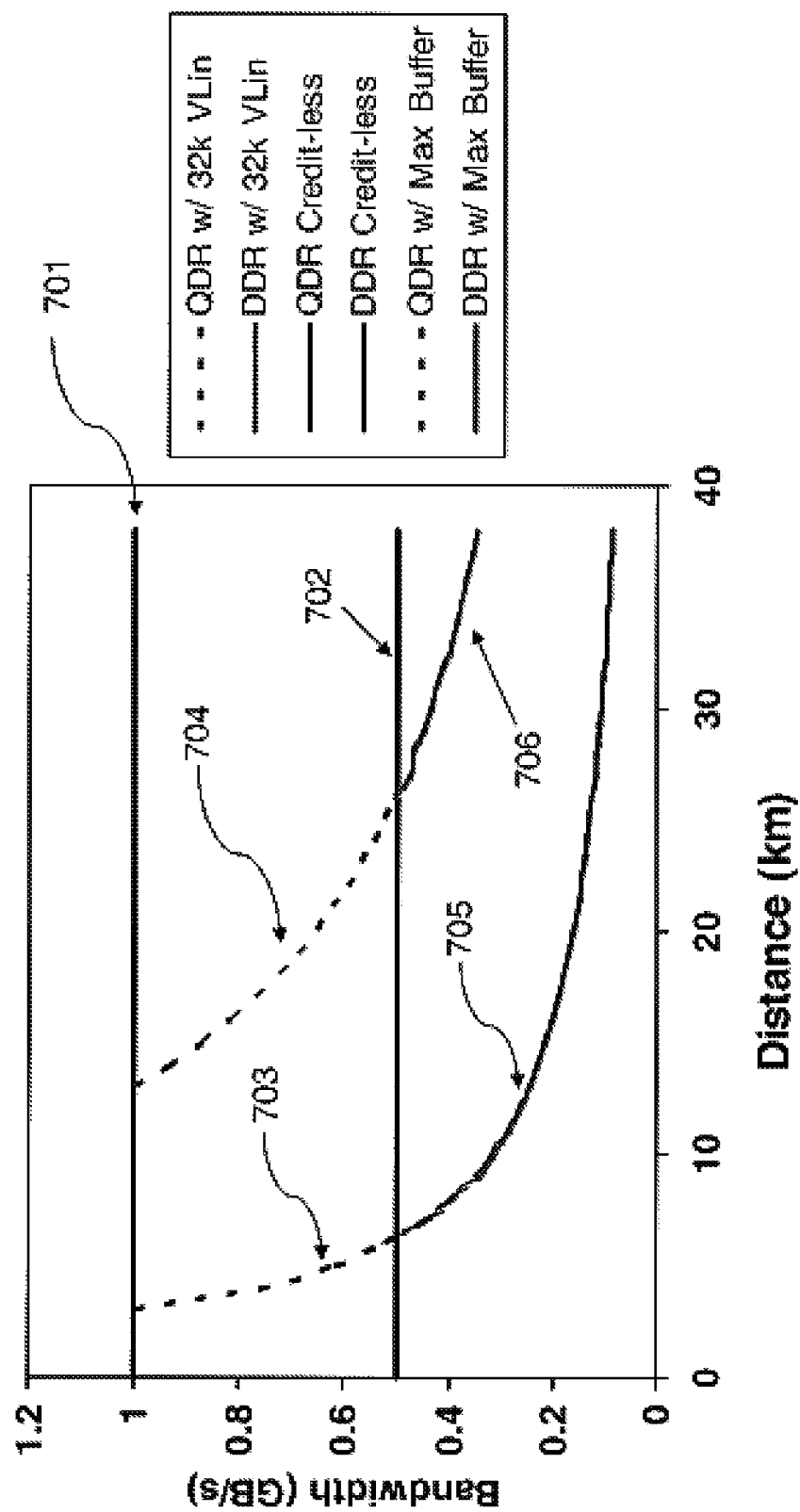
FIG. 7 illustrates data rate drop offs between two nodes in the context of different buffer sizes, flow control, and bandwidth.

With reference to FIG. 7, there is illustrated performance metrics for a bidirectional link comprising an exemplary single fiber in each direction. The QDR Credit-less performance is illustrated by the horizontal line at 1 GB/s bandwidth 701; the DDR Credit-less performance is illustrated by the horizontal line at 0.5 GB/s bandwidth 702; the QDR w/Max Buffer results in the horizontal line at 1 GB/s starting to drop off at approximately 12 km 704; the DDR w/Max Buffer results in the horizontal line at 0.5 GB/s bandwidth starting to drop off at approximately 27 km 706; the QDR w/32 k VLin buffer results in the horizontal line at 1 GB/s starting to drop off at approximately 3 km 703; and the DDR w/32 k VLin buffer results in the horizontal line at 0.5 GB/s starting to drop off at approximately 7 km 705.

As seen in FIG. 7, credit-less operation of the IB link results in consistent transmission rates at any distance without drop off whether at a 1 GB/s transmission rate 701 or a 0.5 GB/s rate 702. These correspond to Quad Data Rate transmission ("QDR") and Double Data Rate Transmission ("DDR"), respectively. The credit based flow control results in a transmission rate drop off as the transmission distance increases. As illustrated in FIG. 7, a larger buffer in the receiver, e.g. "max buffer" is approximately 131 kB, compared to a 32 k buffer, helps to extend the transmission distance before drop off occurs, 704 and 706, compared to the drop off for the smaller buffers 703 and 705. One of the conclusions that can be deduced from FIG. 7 is that at a distance of approximately 27 km, there is no performance advantage in having 1 GB/s capable transmitter/receiver pairs compared to 0.5 GB/s capable pairs when credit based controls are implemented. This is approximately the distance at which the drop off of the 1 GB/s link 704 approaches and meets the 0.5 GB/s line at the point where it begins to drop off 706.

Alternative Embodiments

It will be appreciated that, although specific embodiments of the invention have been described herein for purposes of illustration, various modifications may be made without departing from the spirit and scope of the invention. In particular, the techniques described herein may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in a computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in hardware and software, which includes but is not limited to firmware, resident software, microcode, etc. Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Therefore, the foregoing description of the embodiments has been presented for the purposes of illustration and description. It is not intended to be exhaustive or to limit the embodiments to the precise form disclosed. Many modifications and variations are possible in light of the above teaching.

We claim:

1. In a communication link that couples a first node and a second node, wherein each of the nodes comprises a transmitting device and a receiving device, the nodes exchange credit information over the link to control the other node's rate of data transmission over the link, wherein the transmitting devices are configured to receive credit information, and wherein the receiving devices each comprise a data buffer for storing transmitted data from the other node, a method of managing the communication link comprising the steps of:

disabling a transmitting device from honoring the credit information sent by the other node over the link, wherein the credit information indicates an amount of buffer space available in the receiving devices;

in response to disabling a transmitting device from honoring the credit information, the transmitting device transmitting packets to the receiving devices at an unrestricted rate;

the receiving devices monitoring for dropped packets that were sent by the other node due to lack of buffer space; and in response to detecting a dropped packet due to the lack of buffer space, the receiving device sending a request to the other node for decreasing the rate of transmission.

2. The method of claim 1 wherein the disabling step comprises the step of setting a mode bit in the transmitting device for causing the transmitting device to ignore credit data.

3. The method of claim 2 wherein the disabling step further comprises a step selected from the group of steps consisting of:

a human operator controllably setting the mode bit and a configuration program automatically setting the mode bit.

4. The method of claim 1 wherein the transmitting device decreases the rate of transmission in response to the request for decreasing the rate of transmission by controllably increasing an interpacket delay.

5. The method of claim 4 wherein after decreasing the rate of transmission the transmitting device increases the rate of transmission after a preselected interval during which no request for decreasing the rate of transmission is received.

6. The method of claim 4 wherein after decreasing the rate of transmission, the transmitting device increases the rate of transmission in response to receiving a request for increasing the rate of transmission from the receiver.

7. A transmitter comprising:

an output coupled to a link for transmitting packets over the link at a controlled transmission rate;

an input coupled to the link for receiving credit data and a request to decrease a current transmission rate to a slower transmission rate;

a first circuit coupled to the input for interpreting the credit data and for controlling the current transmission rate for packets to be transmitted over the link in response thereto;

a second circuit for disabling the first circuit in order for the transmitter to operate at an unrestricted transmission rate, wherein said first circuit is disabled from honoring the credit data; and a third circuit coupled to the input for decreasing the unrestricted transmission rate in response to receiving the request to decrease a current transmission rate.

8. The transmitter of claim 7 wherein the input for receiving a request to increase the slower transmission rate and the transmitter further comprises a fourth circuit for increasing the slower transmission rate that was decreased by the third circuit in response to receiving the request to increase the slower transmission rate.

9. The transmitter of claim 7 further comprising a fourth circuit for increasing the slower transmission rate that resulted from the third circuit decreasing the current transmission rate after a time interval wherein no request to decrease a current transmission rate is received.

10. The transmitter of claim 7 wherein the second circuit comprises a circuit for detecting a state of a mode bit in the transmitter indicating whether to disable the first circuit.

11. The transmitter of claim 10, further comprising a circuit controllable by a human operator for selectively setting the state of the mode bit.

12. The transmitter of claim 10, further comprising a circuit controllable by a configuration program for selectively setting the state of the mode bit.

13. The transmitter of claim 7, wherein the third circuit includes a circuit for increasing an interpacket delay of the transmitter.

14. A computer program product readable by machine, wherein the machine comprises a transmitting device and a receiving device for exchanging credit information over a link to control a rate of data transmission received over the link, wherein the transmitting devices are configured to receive credit information, and a data buffer for storing received data and credit logic for counting credit information received, the computer program product comprising:
- a non-transitory storage medium readable by a processing circuit and storing instructions for execution by the processing circuit for performing a method comprising:
- disabling the transmitting device from honoring the credit information received over the link;

the receiving device monitoring for dropped data packets due to lack of buffer space;
- in response to detecting a dropped packet due to the lack of buffer space, sending a request for decreasing the rate of data transmission;

setting a mode bit in the transmitting device for causing the transmitting device to ignore credit information;

the transmitting device decreasing its rate of transmission in response to the receiving device receiving a request for decreasing the rate of transmission;

after decreasing its rate of transmission the transmitting device increasing its rate of transmission after a preselected interval during which no request for decreasing the rate of transmission is received by the receiving device; and the transmitting device increasing its rate of transmission in response to the receiving device receiving a request for increasing the rate of transmission.

* * * * *